United States Patent
Kim et al.

(10) Patent No.: US 8,107,792 B2
(45) Date of Patent: Jan. 31, 2012

(54) RECORDING MEDIUM HAVING A DATA STRUCTURE FOR BACKING UP MANAGEMENT FILES AND RECORDING AND REPRODUCING METHODS AND APPARATUSES

(75) Inventors: Byung Jin Kim, Seongnam-si (KR); Kang Soo Seo, Anyang-si (KR); Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 11/657,645

(22) Filed: Jan. 25, 2007

(65) Prior Publication Data

US 2007/0154180 A1 Jul. 5, 2007

Related U.S. Application Data

(63) Continuation of application No. 10/986,772, filed on Nov. 15, 2004.

(30) Foreign Application Priority Data

Feb. 11, 2004 (KR) .................. 10-2004-0009034

(51) Int. Cl.
*G11B 27/00* (2006.01)

(52) U.S. Cl. .................. 386/281; 386/239; 369/30.08

(58) Field of Classification Search ............ 386/1, 46, 386/83, 95, 124–126, 239, 247, 278, 279, 386/281; 369/30.08

See application file for complete search history.

(56) References Cited

U.S. PATENT DOCUMENTS

| | | | |
|---|---|---|---|
| 6,282,450 | B1 | 8/2001 | Hartlaub et al. |
| 6,341,197 | B1 * | 1/2002 | Ando et al. ............ 386/95 |
| 2003/0103603 | A1 | 6/2003 | Kurita et al. |
| 2004/0234237 | A1 | 11/2004 | Hamada et al. |
| 2004/0252974 | A1 | 12/2004 | Sugimura et al. |
| 2006/0143666 | A1 * | 6/2006 | Okada et al. ............ 725/89 |
| 2007/0086749 | A1 * | 4/2007 | Isobe et al. ............ 386/95 |

FOREIGN PATENT DOCUMENTS

| | | |
|---|---|---|
| CN | 101095346 A | 12/2007 |
| EP | 1 168 314 A2 | 1/2002 |
| EP | 1 286 544 A1 | 2/2003 |
| JP | 01-248358 | 10/1989 |
| JP | 2000-182293 | 6/2000 |

(Continued)

OTHER PUBLICATIONS

International Search Report dated Mar. 8, 2007.
Taiwanese Office Action dated Jun. 6, 2008.
Office Action for Russian patent application No. 2006132347/28(035181) dated dec. 22, 2008.
Japanese Office Action for Japanese Application No. 2006-553043 dated Dec. 11, 2009 (English Translation).

(Continued)

*Primary Examiner* — Thai Tran
*Assistant Examiner* — Mishawn Dunn
(74) *Attorney, Agent, or Firm* — Harness, Dickey & Pierce, P.L.C.

(57) ABSTRACT

In one embodiment, the data structure includes original management data managing reproduction of stream data. The original management data includes at least one stream information file managing at least one stream file, which includes the stream data; at least one playlist file, which manages the stream information; and at least one general management file, which manages the playlist file. The data structure further includes back-up management data duplicating the original management data. The original management data is recorded at an inner radius portion of the recording medium, and the back-up management data is recorded at an outer radius portion of the recording medium.

22 Claims, 12 Drawing Sheets

FOREIGN PATENT DOCUMENTS

| | | |
|---|---|---|
| JP | 2000-268536 | 9/2000 |
| JP | 2002-150716 | 5/2002 |
| JP | 2002-152658 | 5/2002 |
| JP | 2002-208223 | 7/2002 |
| JP | 2002-373099 | 12/2002 |
| JP | 2003-134461 | 5/2003 |
| JP | 2003-168266 | 6/2003 |
| JP | 2003-242012 | 8/2003 |
| TW | 559789 | 11/2003 |

OTHER PUBLICATIONS

Malaysian Office Action dated May 31, 2010 for Application No. PI20044760.
Japanese Office Action dated Oct. 1, 2010 for JP Application No. 2006-553043.
U.S. Office Action dated Nov. 12, 2010 in U.S. Appl. No. 10/986,772.
Japanese Office Action dated Mar. 18, 2011 for JP Application No. 2006-553043.

* cited by examiner

FIG. 9B

| File Table |
|---|
| File Table Header |
| File Record (1) |
| ... |
| File Record (7) |
| File Record (8) |
| File Record (9) |
| File Record (10) |
| File Record (11) |
| ... |
| File Record (18) |
| File Record (19) |
| ... |
| File Record (24) |
| Reserved |

| RBP | Length (byte) | Name (Contents) |
|---|---|---|
| 0 | 2 | File name record number |
| N | 2 | Parent Link (= 2 ; Parent File Record number) |
| M | 1 | File Record Type (= 1 ; Directory File) |
| L | 2 | Attribute (Hidden(=0b) / read inhibit ....) |
| ... | ... | ... |

| RBP | Length (byte) | Name (Contents) |
|---|---|---|
| 0 | 2 | File name record number |
| N | 2 | Parent Link (= 2 ; Parent File Record number) |
| M | 1 | File Record Type (= 3 ; Back-up Directory File) |
| L | 2 | Attribute (Hidden(=1b) / read inhibit ....) |
| ... | ... | ... |

| RBP | Length (byte) | Name (Contents) |
|---|---|---|
| 0 | 2 | File name record number |
| N | 2 | Parent Link (= 8 ; Parent File Record number) |
| M | 1 | File Record Type (= 4 ; Back-up Data File) |
| L | 2 | Attribute (Hidden(=1b) / read inhibit ....) |
| ... | ... | ... | ex. File Record Type
- value(0):Free File Record
- value(1):Directory File Record
- value(2):Data File Record
- value(3):Back-up Directory File Record
- value(4):Back-up Data File Record

RECORDING MEDIUM HAVING A DATA STRUCTURE FOR BACKING UP MANAGEMENT FILES AND RECORDING AND REPRODUCING METHODS AND APPARATUSES

FOREIGN PRIORITY INFORMATION

This application claims the benefit of priority under 35 U.S.C. 119 on Korean Application No. 10-2004-0009034, filed on Feb. 11, 2004, which is hereby incorporated by reference in its entirety.

DOMESTIC PRIORITY INFORMATION

This is a continuation application of application Ser. No. 10/986,772 filed Nov. 15, 2004, the entire contents of which are hereby incorporated by reference.

BACKGROUND OF THE INVENTION

1. Field of the Invention

The present invention relates to high density recording media such as read-only blu-ray discs (BD-ROM).

2. Discussion of Related Art

Optical discs are widely used as an optical recording medium. Presently, of the optical discs, a new high density optical recording medium (HD-DVD), such as the Blu-ray Disc (hereafter called as "BD"), for recording and storing a large amount of high definition video and audio data is under development.

Currently, global standard technical specifications of the Blu-ray Disc (BD), a next generation HD-DVD technology, are being established as a next generation optical recording solution that can store amounts of data significantly surpassing present DVDs.

In relation to this, development of optical reproducing apparatuses for the Blu-ray Disc (BD) standards has also started. However, the Blu-ray Disc (BD) standards are not complete yet, and there has been difficulty in developing a complete optical reproducing apparatus.

Particularly, for effective reproduction of data from the Blu-ray Disc (BD), a systemized file of data structure for information such as management information is desired. However, in the present Blu-ray Disc (BD) standards, because consolidated standards for constructing and using the file information are not complete yet, there are many restrictions on the development of a Blu-ray Disc (BD) optical reproducing apparatus.

SUMMARY OF THE INVENTION

The present invention relates to a recording medium having a data structure for managing reproduction of data recorded thereon.

In one embodiment, the data structure includes original management data managing reproduction of stream data. The original management data includes at least one stream information file managing at least one stream file, which includes the stream data; at least one playlist file, which manages the stream information; and at least one general management file, which manages the playlist file. The data structure further includes back-up management data duplicating the original management data. The original management data is recorded at an inner radius portion of the recording medium, and the back-up management data is recorded at an outer radius portion of the recording medium.

In one embodiment, the recording medium does not include duplicate data of the stream data.

In an embodiment, the original management data and the backup management data are not recorded in the same ECC block.

The present invention further relates to a method of reproducing data recorded on a recording medium.

In one embodiment, the method includes reading at least one management data of original management data recorded at an inner radius portion of the recording medium and back-up management data, which is duplicate data of the original management data, recorded at an outer radius portion of the recording medium. The original management data manages reproduction of stream data. The management data includes at least one stream information file managing at least one stream file, which includes the stream data; at least one playlist file, which manages the stream information file; and at least one general management file, which manages the playlist file. The stream data may be reproduced based on the at least one management data.

The present invention still further relates to an apparatus for reproducing data recorded on a recording medium.

In one embodiment, the apparatus includes a controller reading at least one management data of original management data recorded at an inner radius portion of the recording medium and back-up management data, which is duplicate data of the original management data, recorded at an outer radius portion of the recording medium. The original management data manages reproduction of stream data and includes at least one stream information file, which manages at least one stream file including the stream data; at least one playlist file, which manages the stream information file; and at least one general management file, which manages the playlist file. The controller may control the stream data to be reproduced based on the at least one management data.

The present invention also relates to methods and apparatuses for recording a data structure for managing reproduction of data on a recording medium.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention.

In the drawings;

FIG. 9B illustrates file system information recorded on an optical disc for the example of FIG. 9A.

DETAILED DESCRIPTION OF THE EXEMPLARY EMBODIMENTS

Reference will now be made in detail to the embodiments of the present invention, examples of which are illustrated in the accompanying drawings. Though words used in the present invention are selected from widely used general words, there are words the applicant has selected at his discretion and the detailed meanings of these words are described in relevant parts of the description of the present invention. As such, the present invention is to be understood by meanings of the words provided in the disclosure.

In relation to above, a "stream file" in the present invention means a file having actual user data recorded therein on the recording medium, an example of which will be described in detail with reference to FIG. 1.

A "back-up" file in the present invention means a file for preserving data in a management file, an example of which will be described in detail with reference to FIG. 3.

Figure 1:
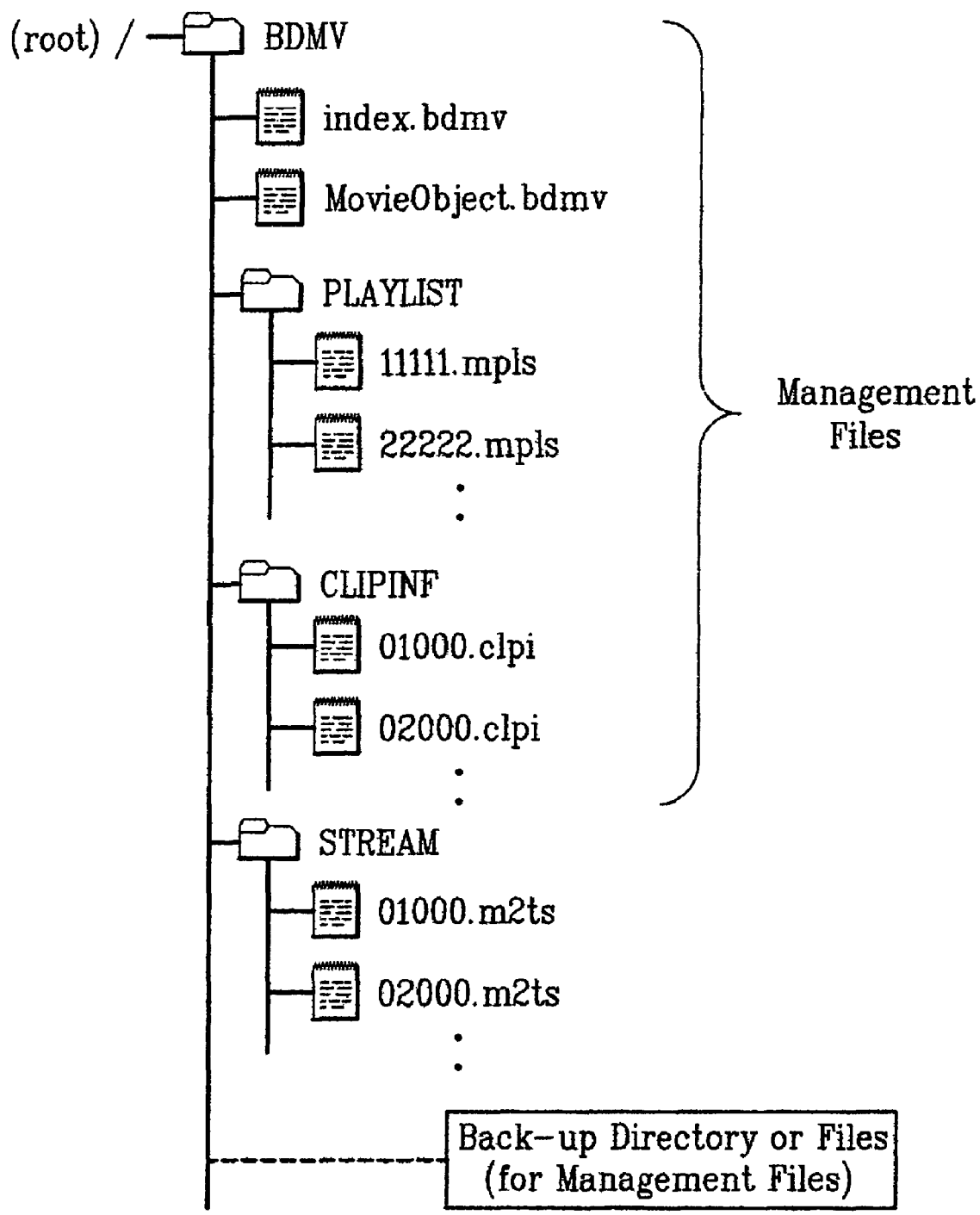
FIG. 1 illustrates a file or data structure for managing data on a high density recording medium (e.g., a BD-ROM) in accordance with an example embodiment of the present invention.

FIG. 1 illustrates a file or data structure for managing data on a high density recording medium in accordance with an example embodiment of the present invention. For this and the other embodiments of the present invention an optical disc, and more particularly, a BD-ROM will be used as an example of the high density recording medium. As shown, the file structure of a BD-ROM according to one embodiment of the present invention includes at least one BDMV directory under a root directory. The BDMV directory includes an index file index bdmv and an object file MovieObject.bdmv, discussed in detail below as general (upper) files for securing user interactivity. The BDMV directory also includes a stream directory STREAM, a playlist directory PLAYLIST, and a clipinfo directory CLIPINF.

The stream directory STREAM includes files of video and audio streams (called "AV streams") recorded in particular formats on the disc. An "AV stream" is recorded as well-known MPEG2 transport packets and the AV stream files (e.g., 01000.m2ts and 02000.m2ts) have a file name extension of "*.m2ts". However, there will be cases where the AV stream files are not recorded in the MPEG2 format. In these instances, a file name extension or expansion proper to the format will be used. For example, if the AV stream files are recorded in a text data format, the file expansion name may be "*.txt". Also, an AV stream file is sometimes called a clip stream file.

The clipinfo (or clip information) directory CLIPINF includes clip information or clipinfo files *.clpi, each having a one-to-one correspondence with an AV stream file. A clipinfo file *.clpi has attribute information and timing information of the corresponding stream file and serves as a management file. More specifically, the information in the clipinfo file includes mapping information that enables mapping of a Presentation Time Stamp (PTS) to a Source Packet Number (SPN) of a source packet in the corresponding AV stream file. This map is referred to as an Entry Point Map or "EP_map".

A stream file and the corresponding clipinfo file may be called a "clip", collectively. Accordingly, the file "01000.clpi" in the clipinfo directory CLIPINF has attribute information and timing information on the file "01000.m2ts" in the stream directory STREAM, and the files "01000.clpi" and "01000.m2ts" form a clip.

The playlist directory PLAYLIST includes playlist files *.mpls, each having at least one playitem PlayItem designating a playing interval of a particular clip. The playitem PlayItem includes timing information on a play start time In-Time and play end time Out-Time of a particular clip desired to play, and identifies the clip by providing the clip information file name in a Clip_Information_File_name field. Using the PTS information in the In-Time and Out-time information, the EP map of the named clipinfo file allows a particular stream address or position (e.g., SPN) of the corresponding stream file *.m2ts to be searched for and obtained such that reproduction of the playitem results in reproduction of the clip.

The playlist file *.mpls serves as a basic management file for playing a desired clip by providing at least one playitem PlayItem. Moreover, the playlist file *.mpls may also provide a sub-playitem SubPlayItem for managing reproduction of, for example, supplemental data, which may be reproduced synchronized or non-synchronized with the playitem PlayItem.

In the BD directory BDMV, there are an index file index.bdmv and an object file MovieObject.bdmv as general files for securing a user's interactivity. The index file index.bdmv has an index table providing menu information and title information the user can select. The MovieObject.bdmv provides navigation commands for, for example, executing a playlist, and may be called from a selection made in the index table.

As will be appreciated, except for files in the STREAM directory, the other files discussed above are management files for reproducing, for example, files or portions of files from the STREAM directory. As will be discussed in detail below, these files (e.g., index.bdmv file, MovieObject.bdmv file, playlist files, and clip information files) are referred to as database files or navigation database files, and the index.bdmv file, MovieObject.bdmv file, playlist directory PLAYLIST and clipinfo directory CLIPINO may be collectively referred to as the database or navigation database.

If a defect exists in a management file, information (e.g., AV stream data) may not be reproducible, and if the defect is serious, information may not be reproducible from the entire disc. Accordingly, the present invention, as shown in FIG. 1, provides for constructing a back-up directory or files for preserving the management files. Various embodiments of data structures and methods for the back-up files will be described in detail below. But first, example embodiments of formats for an optical disc storing these data structures will be described with respect to FIGS. 2A and 2B.

Figure 2A:
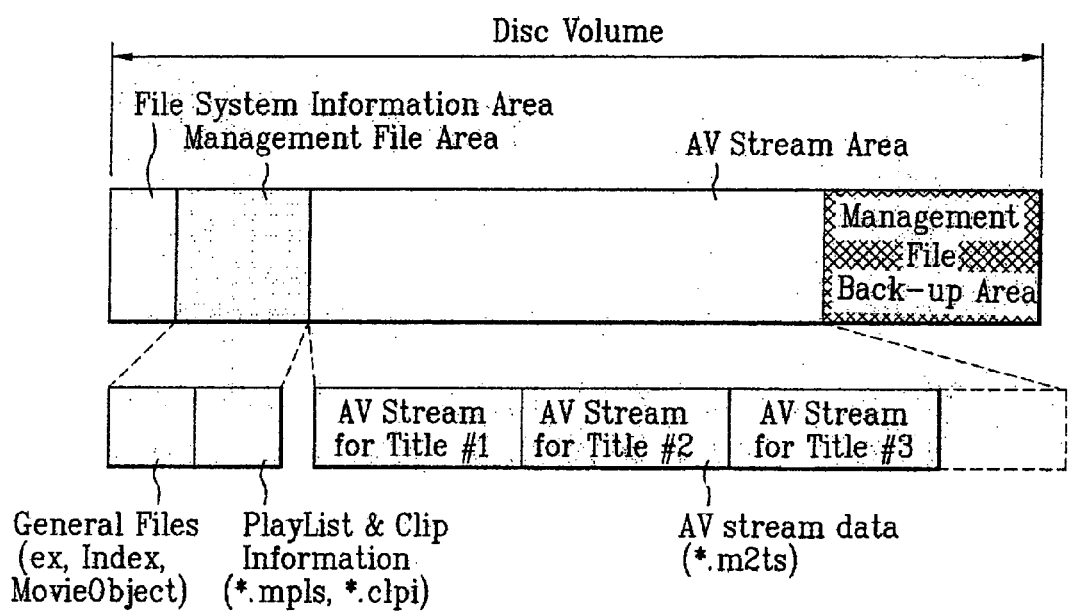
FIGS. 2A and 2B illustrate formats of a high density optical disc in accordance with example embodiments of the present invention.

Starting from an inner radial portion of the disc and moving to an outer radial portion of the disc, FIG. 2A illustrates that the disc volume is organized into a File System Information Area, a Management File Area, an AV Stream Area and a Management File Back-Up Area. The File System Information Area stores system information for managing the entire disc as will be described in more detail below with respect to FIGS. 9A and 9B. The Management File Area includes a General Files area for recording the index file index.bdmv and the object file MovieObject.bdmv, and a PlayList & Clip Information area for recording the playlist directory PLAYLIST and the clipinfo directory CLIPINF. According, the Management Files Area may also be referred to as the Database Area. The AV Stream Area is for recording the actual audio/video/graphic data.

The Management Files Back-up Area allocated separately from the existing management files area is for recording the back-up files and/or directories. In this embodiment the Management Files Back-up Area is disposed at the outer radial portion of the disc.

Figure 2B:
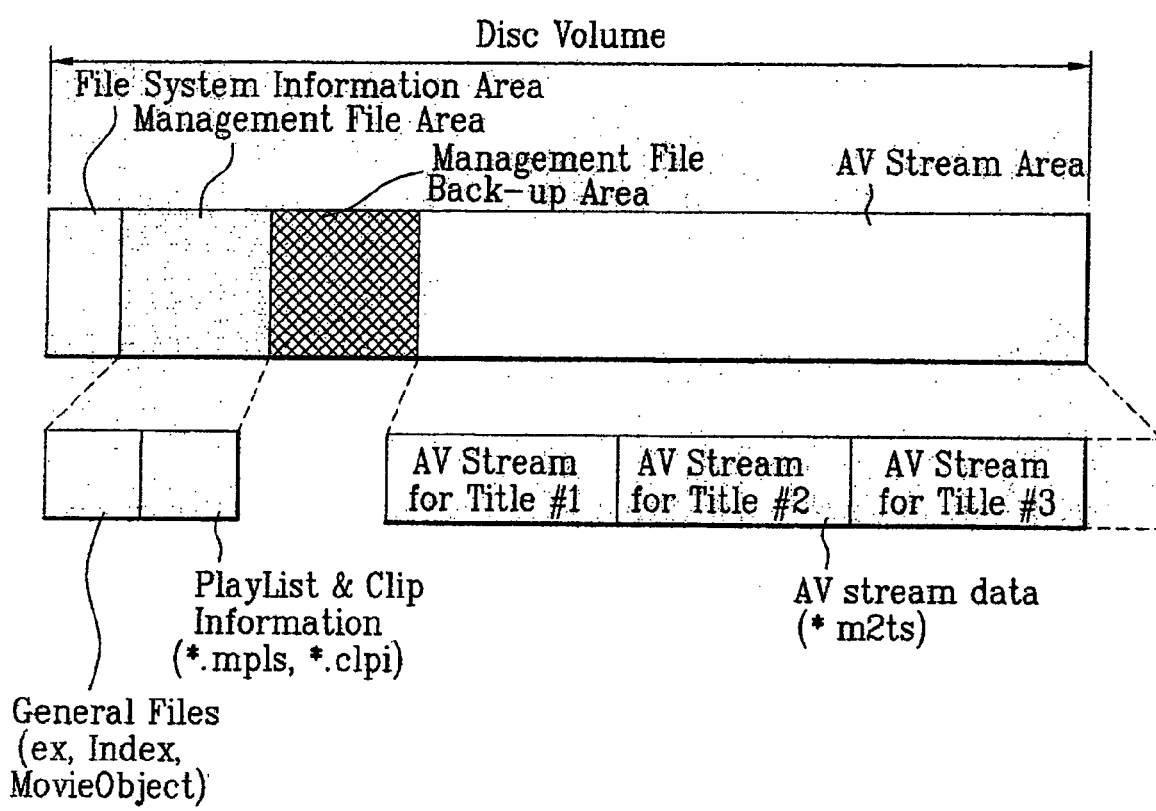

FIG. 2B illustrates another embodiment of the disc volume format. As shown, the embodiment of FIG. 2B is the same as the embodiment of FIG. 2A except that the Management Files Back-up Area is formed at an inner radial portion of the disc. More specifically, the Management Files Back-up Area follows the Management File Area. However, even in this embodiment, the back-up files are not recorded on the same recording area of the disc as the management files. Therefore, the management file data and a back-up file data for preserving the management file data are recorded, not in one ECC block, but in separate ECC blocks. This enables regular reproduction by using the back-up file in case there is a defect in the ECC block of a particular management file.

As will be appreciated, the use of back-up files may be only for backing-up the management files, and is applicable to all management files. That is, the back-up files are not limited to a particular management file, but may be formed for all of the management files on the optical disc. The back-up files are recorded physically separate from an original Management Files Area. Particularly, the data of the management files and the data of the back-up files are not recorded in the same ECC Block.

Various methods and data structures for the back-up files will now be described with respect to FIGS. 3-7.

Figure 3:
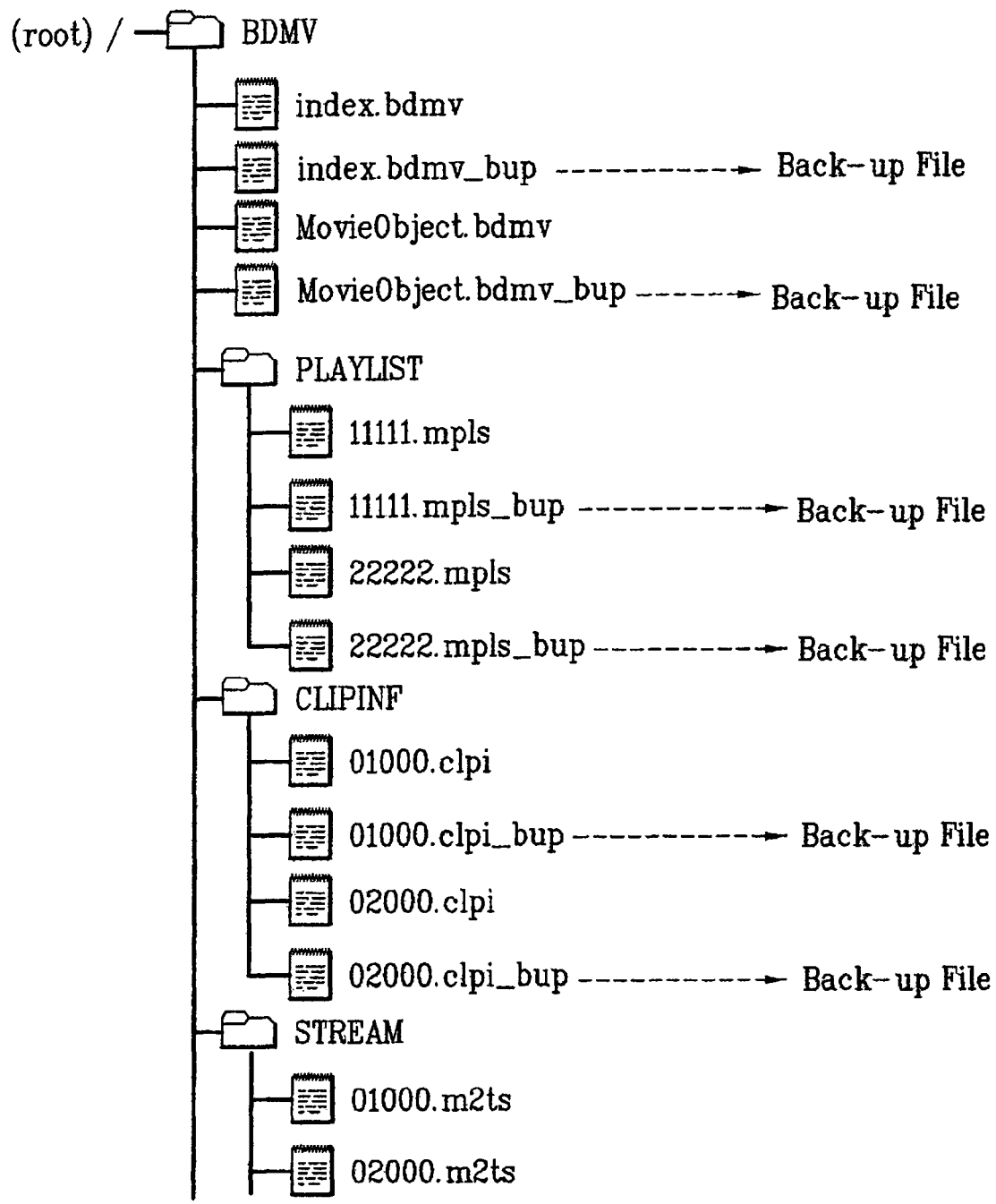
FIGS. 3-8 illustrate a file or data structure of the back-up files according to various embodiments of the present invention.

FIG. 3 illustrates a file or data structure of the back-up files according to a first embodiment of the present invention. As shown, in this embodiment, each back-up file, which is a copy of the corresponding management file, is stored in the same directory as the corresponding management file. In relation to this, "_bup" has been added to the extension of an existing management file name to provide the corresponding back-up file name. For example, the back-up file of the index file "index.bdmv" is "index.bdmv_bup". However, this naming convention is but one example, and other naming conventions will be readily apparent.

As mention above, the back-up file is formed in a directory having the respective management file positioned therein, without forming a separate directory for the back-up file. Therefore, the index file index.bdmv and the object file MovieObject.bdmv are management files in the BDMV directory, and the "index.bdmv_bup" and the MovieObject.bdmv bup" back-up files are formed in the same BDMV directory. Similarly, the back-up file "*.mpls_bup" of the playlist file "*.mpls" is formed in the same playlist directory PLAYLIST, and the back-up file "*.clpi_bup" of the clipinfo file "*.clpi" is formed in the same clipinfo directory CLIPINF. As described before, no back-up files are formed for the stream files *.m2ts in the stream directory STREAM since they are not management files.

For reference, it is apparent that even if the back-up file *.*_bup is formed in the same directory as the corresponding management or database file, this is only from the file structure view, and the disc area storing the back-up file is as shown in FIG. 2A or 2B.

Figure 10:
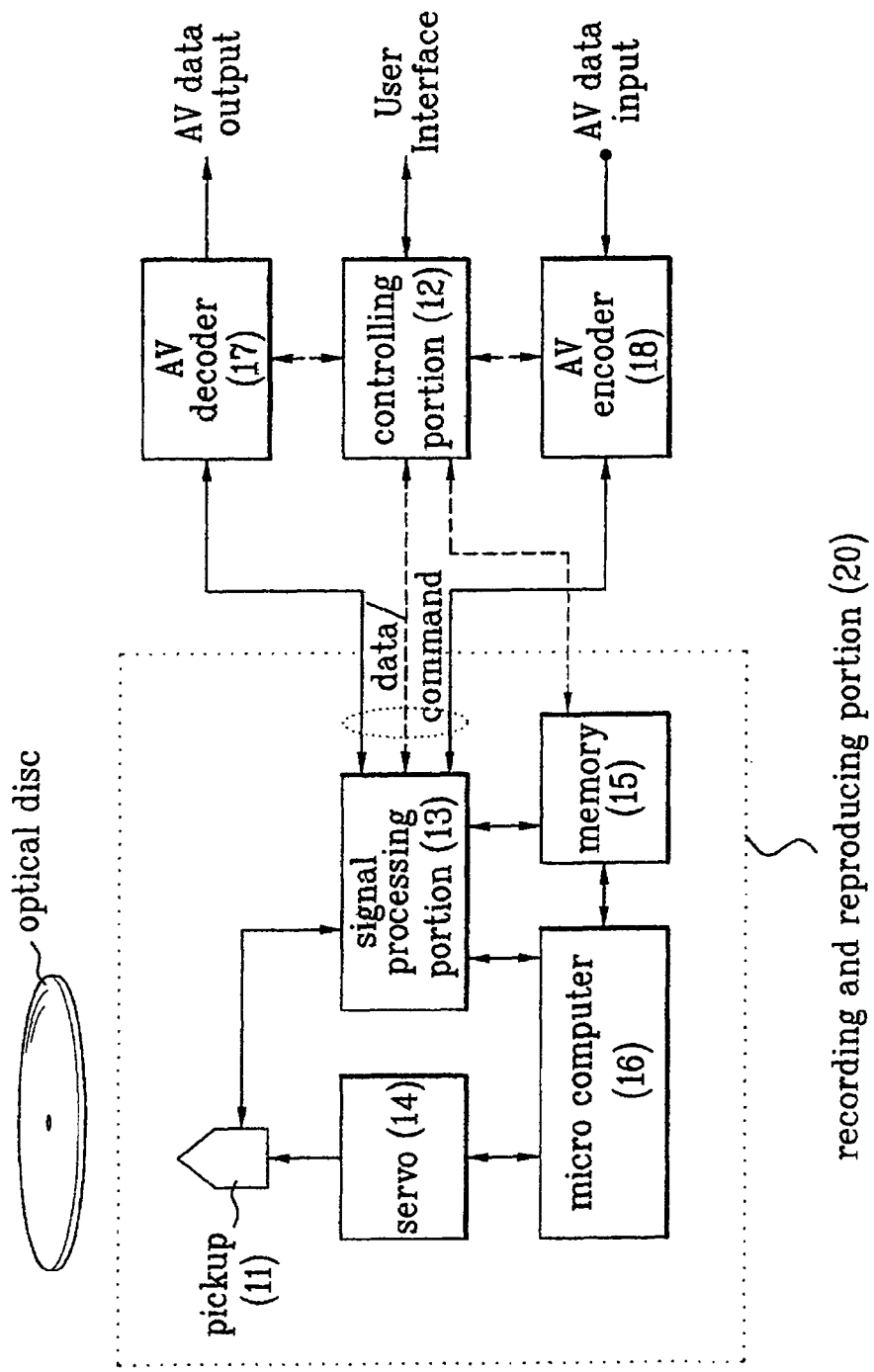
FIG. 10 illustrates an embodiment of an optical recording and reproducing apparatus of the present invention.

Therefore, according to this first embodiment, an optical recording and reproducing apparatus (e.g., as shown in FIG. 10) reproduces the management file and the back-up file existing in the same directory together, regardless of the existence of a defect in the management file, to reproduce the disc more stabily.

Figure 4:
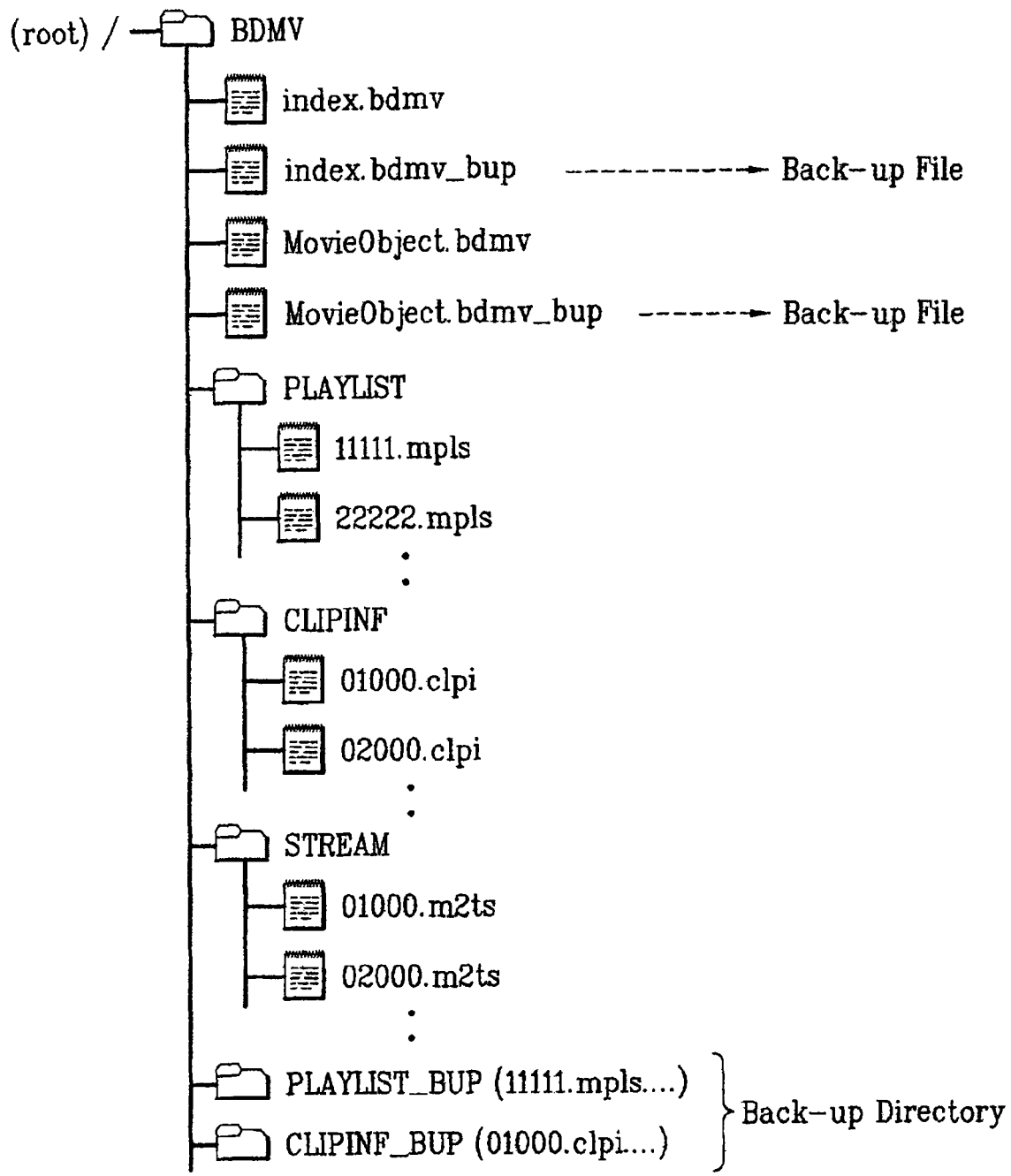

FIG. 4 illustrates a file or data structure of the back-up files according to a second embodiment of the present invention. As shown, back-up files of the upper management files, namely the index.bdmv and MovieObject.bdmv are formed in the same BDMV directory. The back-up files for the other management files, however, are recorded in separate, respective back-up file directories. The separate back-up file directories are a back-up playlist directory PLAYLIST_BUP and a back-up clipinfo directory CLIPINF_BUP.

That is, since the upper management files index.bdmv and MovieObject.bdmv form no separate back-up file directory, the back-up files "index.bdmv_bup" and "MovieObject.bdmv_bup" for the index file index.bdmv and the object file MovieObject.bdmv in the BDMV directory, are formed in the BDMV directory. Meanwhile, the back-up files for the playlist file *.mpls and the clipinfo file *.clpi are recorded in the separate back-up directories "PLAYLIST_BUP", and "CLIPINF_BUP". In relation to this, because, the directory itself is appropriately identified as a back-up directory, the back-up files in the back-up directories may or may not include the "_bup" or other naming convention to identify the files therein as back-up files.

Therefore, in the case of the second embodiment of the present invention, an optical recording and reproduction apparatus (e.g., the apparatus of FIG. 10) reproduces the upper management files (e.g., index and MovieObject) and their associated back-up files in the BDMV directory regardless of defects in the upper management files. However, the recording and reproducing apparatus reproduces the management files in their own directory (e.g., the playlist file *.mpls and the clipinfo file *.clpi) without reproducing their associated back-up files unless there is a defect in the management file directory. If there is a defect in a management file directory (e.g., PLAYLIST and CLIPINF), then the back-up files recorded in the relevant back-up directory (e.g., PLAYLIST_BUP and CLIPINF_BUP) are used.

Figure 5:
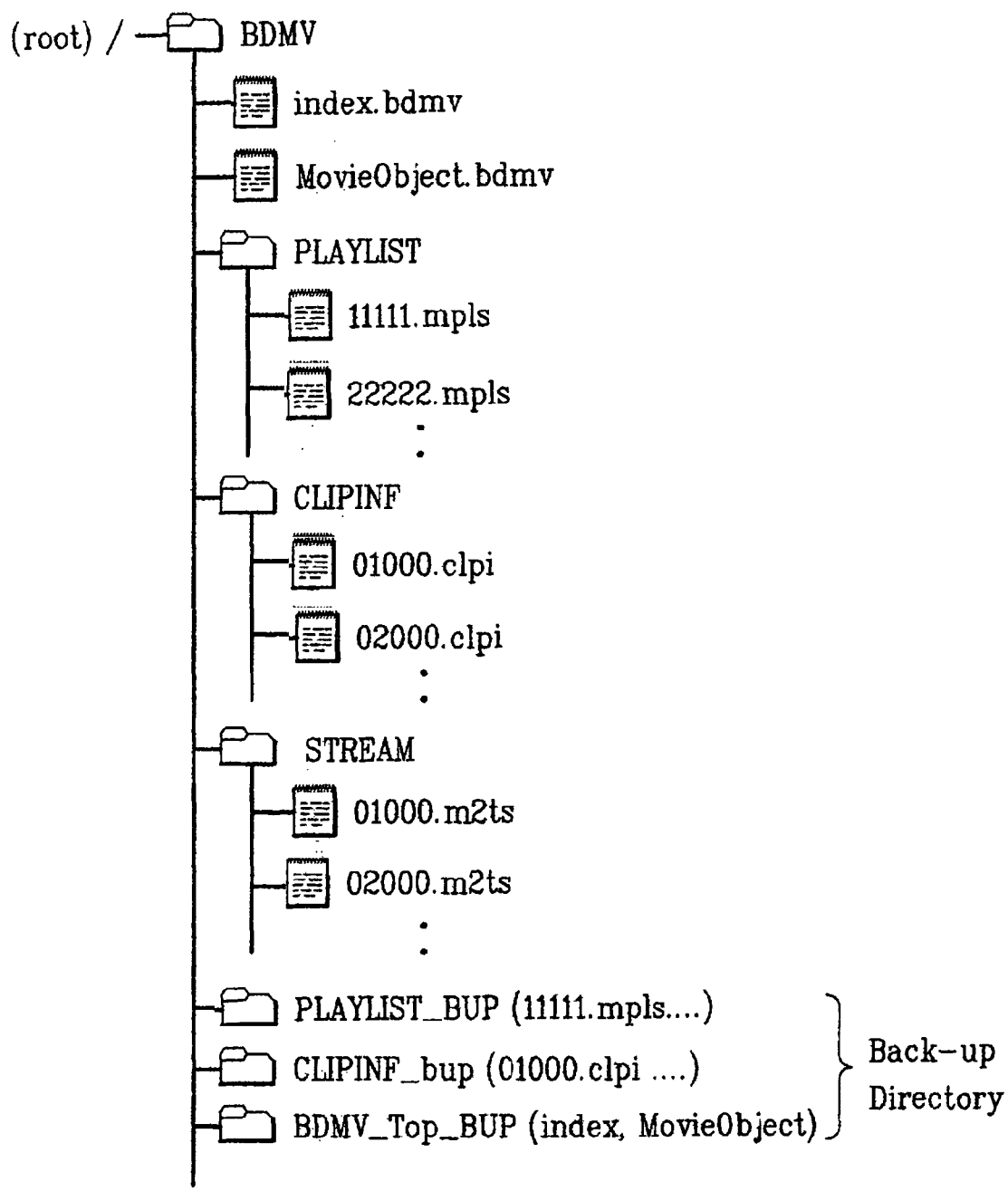

FIG. 5 illustrates a file or data structure of the back-up files according to a third embodiment of the present invention. The embodiment of FIG. 5 is the same as the embodiment of FIG. 4 except that a separate "BDMV_Top_BUP" directory exists in the BDMV directory, and the back-up files of the index file index.bdmv and the object file MovieObject.bdmv are recorded in the BDMV_Top_BUP directory instead of directly in the BDMV directory. In relation to this, because the directory itself is appropriately identified as a back-up directory, the back-up files in the back-up directories may or may not include the "_bup" extension or other naming convention to identify the files therein as back-up files.

Therefore, according to the third embodiment of the present invention, though an optical recording and reproducing apparatus (e.g., the apparatus of FIG. 10) uses management files in an existing BDMV directory, the playlist directory PLAYLIST, and clipinfo directory CLIPINF, if one or more of the above directories have defects, then the associated back-up directory the "PLAYLIST_BUP", "CLIPINF_BUP", and "BDMV_Top_BUP" are used. For example, if the existing index file index.bdmv has a defect, the BDMV_Top_BUP back-up directory is used for reproduction of the disc by using the back-up index file in the BDMV_Top_BUP directory.

Figure 6:
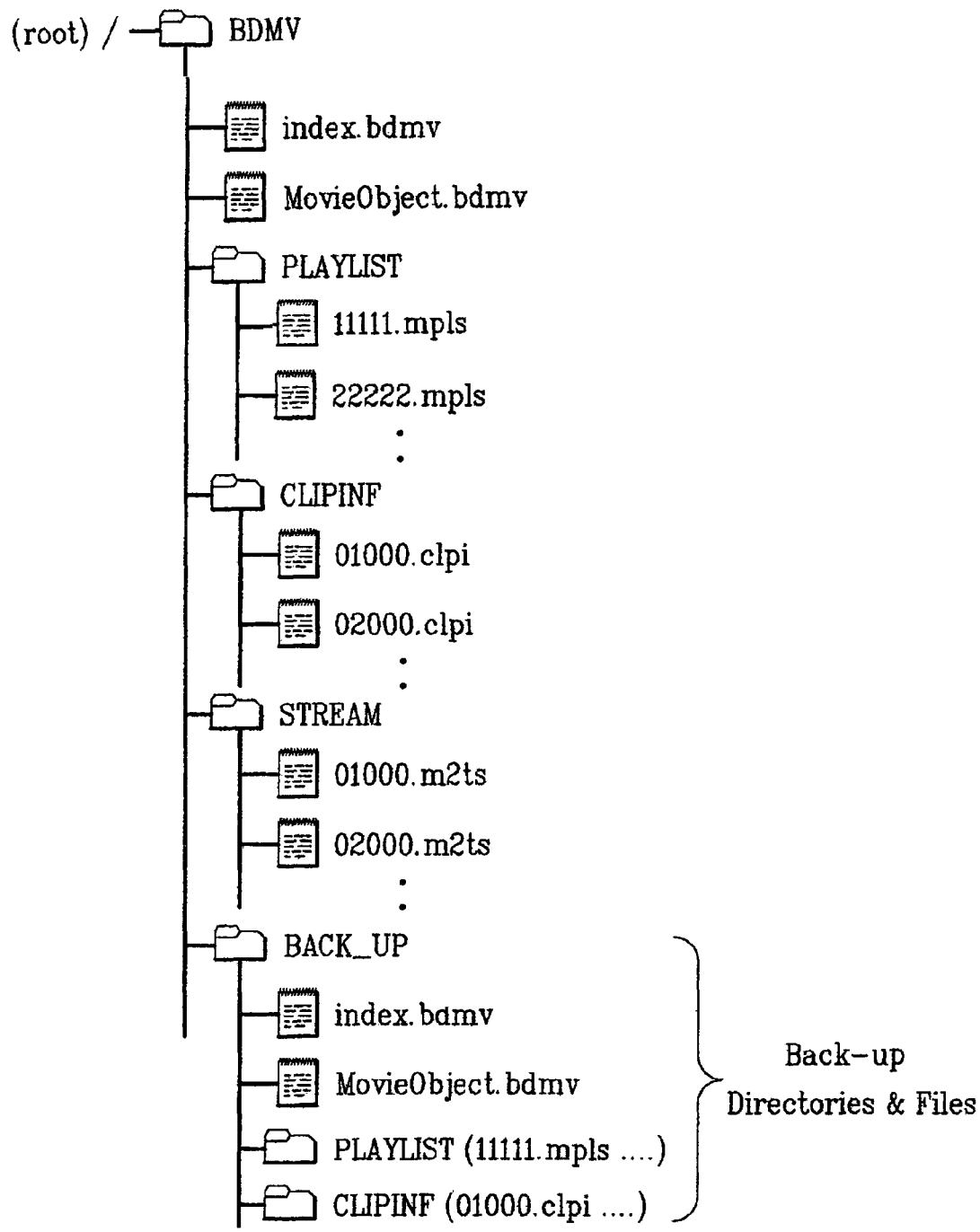

FIG. 6 illustrates a file or data structure of the back-up files according to a fourth embodiment of the present invention. In this embodiment, a back-up directory BACK-UP is formed in the BDMV directory. The back-up directory BACK-UP includes a back-up file for each of the management files.

That is, the portion of the existing BDMV directory referred to herein as the database and having only the management files included therein, i.e., a portion excluding the stream directory STREAM, is copied in the back-up directory BACK_UP. According to this, the back-up directory BACK-UP (or back-up database directory) includes the database files such as the index file index.bdmv, the object file MovieObject.bdmv, the playlist files "*.mpls" and the clipinfo file "*.clpi". As shown in FIG. 6, the playlist files and clipinfo files may be recorded in a respective playlist directory PLAYLIST and clipinfo directory CLIPINF in the back-up directory BACK-UP. In this manner, the back-up directory BACK-UP replicates the database.

Therefore, according to the fourth embodiment of the present invention, an optical recording and reproduction apparatus (e.g., the apparatus of FIG. 10) reproduces the disc by using the back-up management file in the back-up directory BACK-UP instead of the BDMV directory, if any one of the respective management files in the existing BDMV directory has a defect.

Figure 7:
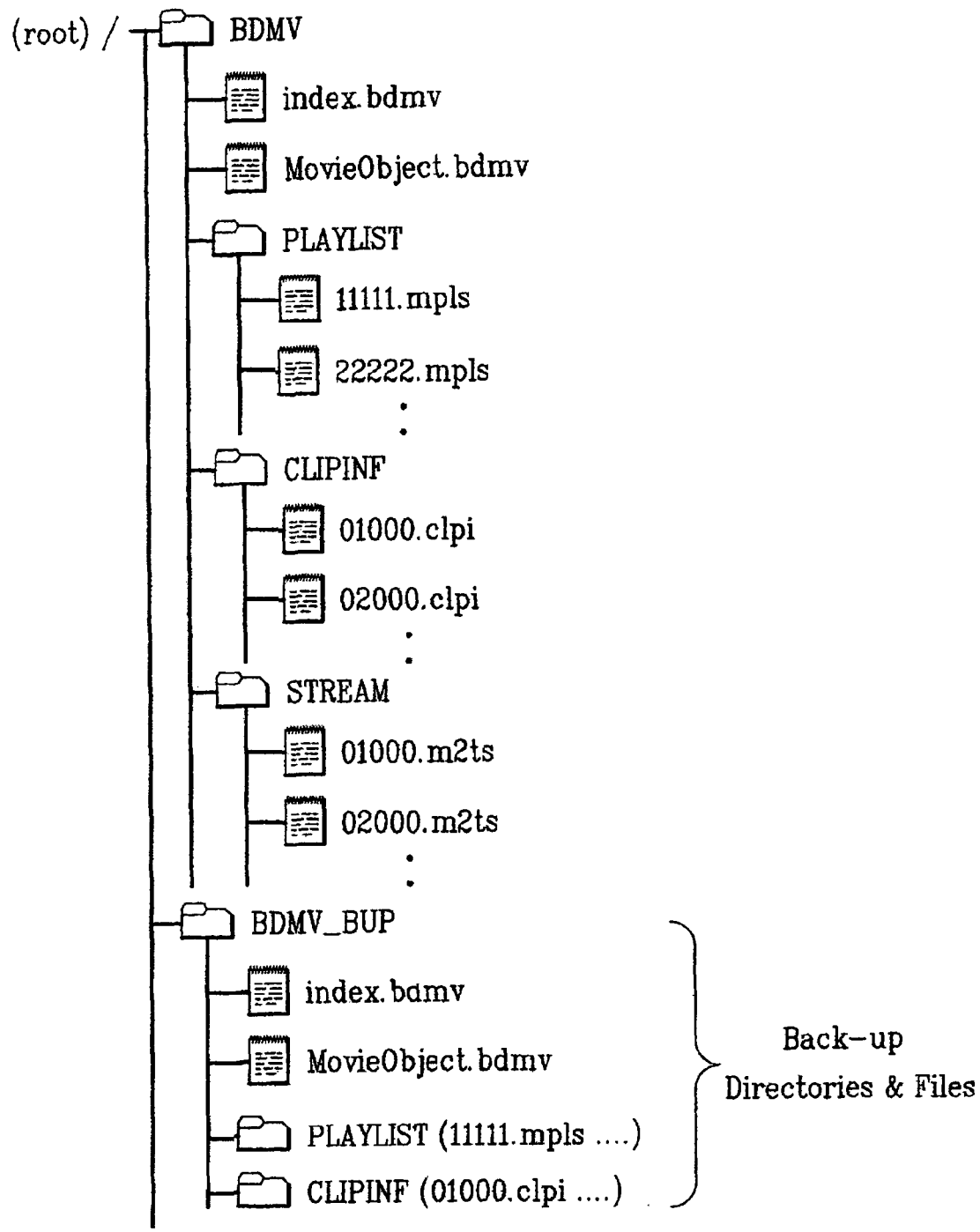

FIG. 7 illustrates a file or data structure of the back-up files according to a fifth embodiment of the present invention. This embodiment is the same as the embodiment of FIG. 6 except that the back-up directory is called BDMV_BUP and is saved directly in the root directory, and not in the BDMV directory.

That is, the root directory root of the BD-ROM is provided with two lower directories—one is the BDMV directory having the existing management film and the stream file *.m2ts, and the other the BDMV_BUP directory backing up only the management files in the BDMV directory.

According to this, the BDMV_BUP directory has the index file index.bdmv and the object file MovieObject.bdmv recorded thereon as backed-up upper management file, and the playlist directory PLAYLIST and clipinfo directory CLIPINF as lower directories. The backed-up playlist files *.mpls and the clipinfo files *.clpi are recorded in these lower directories.

Therefore, in the case of the fifth embodiment of the present invention, an optical recording and reproducing apparatus (e.g., the apparatus of FIG. 10) reproduces the disc by using the management files in the existing BDMV directory under the root directory. But, if there is a defect in any one of management files in the BDMV directory, the disc is reproduced by using the back-up management file in the BDMV_BUP directory under the root directory.

Figure 8:
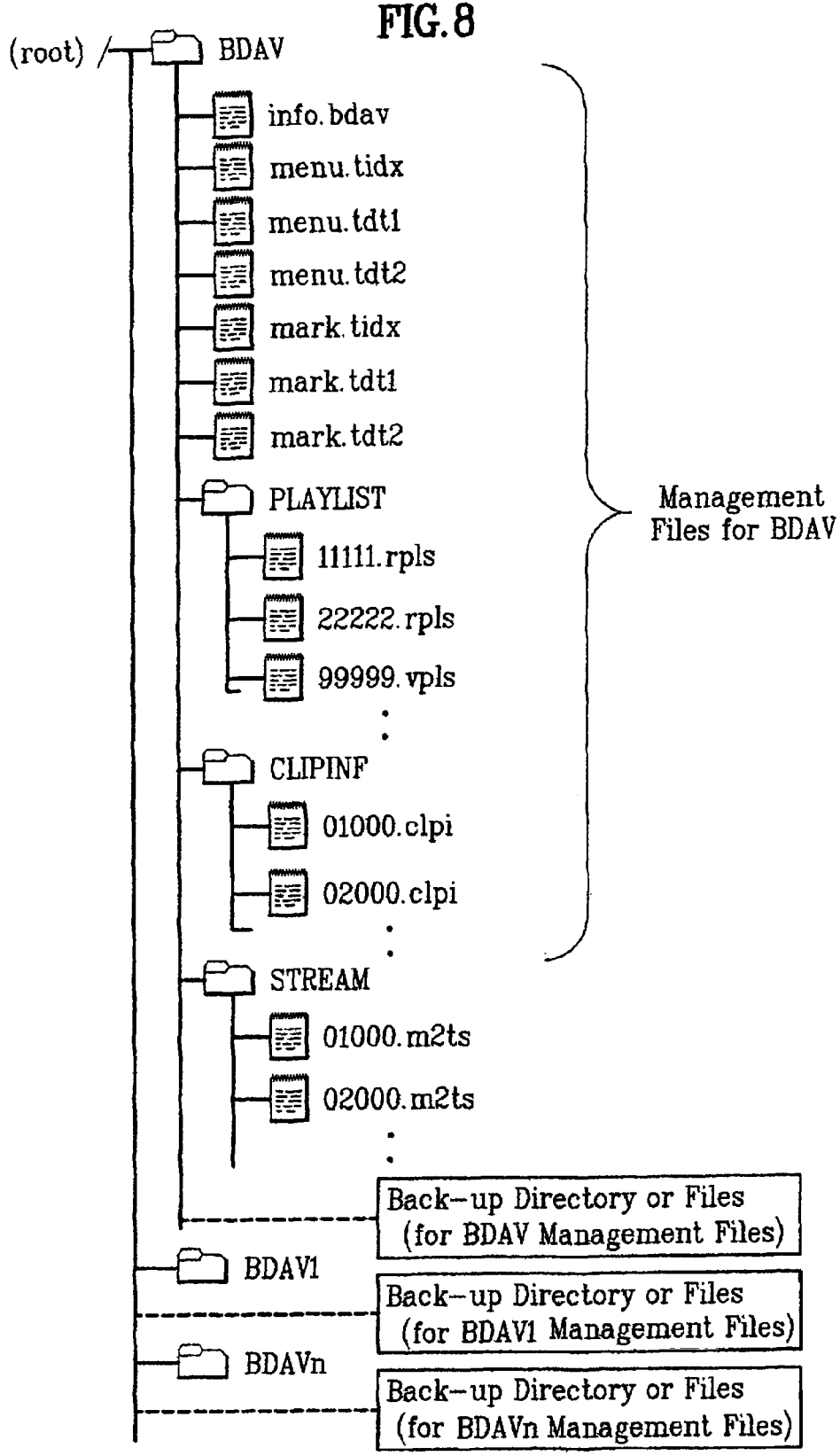

FIG. 8 illustrates a file or data structure of the back-up files according to a fifth embodiment of the present invention. While the previous embodiments were described using a BD-ROM as the example of the optical recording medium, this embodiment is described using a BD-RE as the example of the optical recording medium.

As shown, a root directory of the BD-RE may have a plurality of BDAV directories, each having "info.bdav", "menu.*", "mark.*" files as upper management files. Further, each BDAV directory includes a stream directory STREAM, a playlist directory PLAYLIST and a clipinfo directory CLIPINF, where the playlist directory and the clipinfo directory CLIPINF are for recording management files for managing the stream files in the stream directory STREAM.

Accordingly, while the previous embodiments used a BD-ROM as the example recording medium, it will be apparent that these embodiments are applicable to other recording media such as other optical recording media like a BD-RE. FIG. 8 graphically illustrates this applicability. Along with this, the file structure having a back-up file of the present invention is applicable to, for example, a BD-WO (BD-Write Once).

Figure 9A:
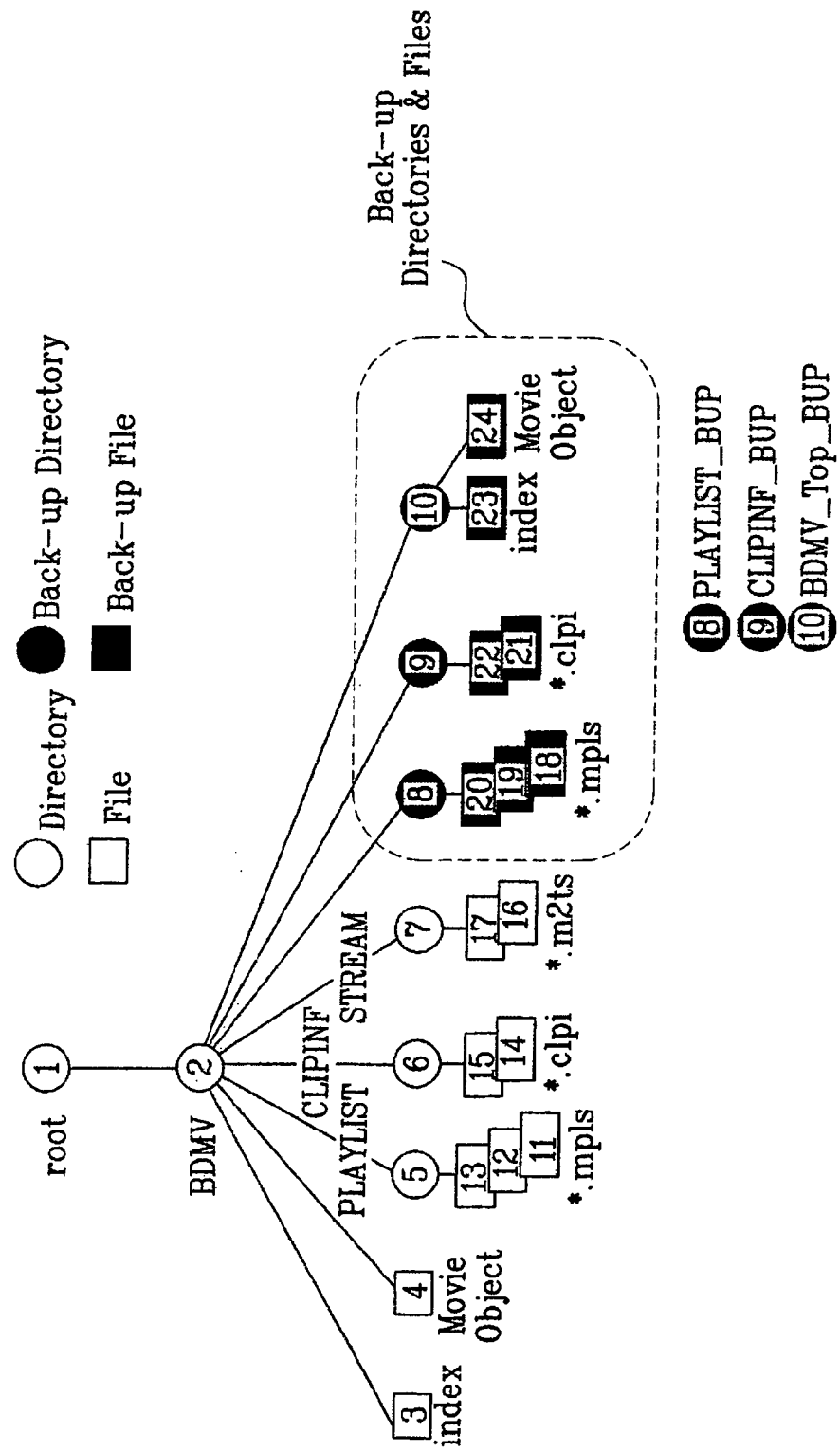
FIG. 9A illustrates an embodiment of a file structure of the present invention in a tree form.

FIGS. 9A and 9B illustrate a data structure for and methods of recording and reproducing file system information for managing the management and back-up files having a file structure according to the present invention.

FIG. 9A illustrates the file structure of the third embodiment (FIG. 5) in a tree form for the purposes of explaining the file system information according to an embodiment of the present invention. The circles in the FIG. 9A denote directories Directory, rectangles denote files in a directory, shaded circles or rectangles denote back-up directories or back-up files, unshaded circles and rectangles denote non-back-up directories and non-back-up files, and numbers of the directories and files are in series for identification purposes.

Therefore, a serial number "8" denotes the PLAYLIST_BUP directory, meaning a back-up directory for the PLAYLIST directory having serial number of 5. A serial number "9" denotes the CLIPINF_BUP directory, meaning a back-up directory for the CLIPINF directory having a serial number of 6. A serial number 10 denotes a BDMV_Top_BUP directory, meaning a back-up directory produced separately for storing back-up files of the index file index.bdmv and the object file MovieObject.bdmv having serial numbers 3 and 4, respectively.

The back-up directories have back-up files. For example, the PLAYLIST_BUP directory 8 has back-up files 18, 19, and 20 of the playlist files *.mpls 11, 12 and 13, the CLIPINF_BUP directory 9 has a back-up files 21 and 22 of the clipinfo files *.clpi 14 and 15, and the BDMV_Top_BUP directory 10 has back-up files 23 and 24 of the index file index.bdmv 3 and the object file MovieObject.bdmv 4.

FIG. 9B illustrates a file table for recording file information for each file in the file structure in FIG. 9A, which is a portion of file system information recorded on the File system Information Area shown in FIG. 2A or 2B. When the disc is loaded, an optical recording and reproducing apparatus (e.g., the apparatus of FIG. 10) reads the file system information in the File system Information Area to know types of and positions of files recorded on the disc.

The file table shown in FIG. 9B has File Table Header information and has file information for each file (called a "File Record") arranged in series. Each File Record has information (File name record number) on a name of the file (file name), upper link (called as "Parent Link") information providing the file name record number of a parent file record as link information in view of the file structure, a file record type for indicating kind of the file, and an attribute for indicating a file attribute. Besides these kinds of information, it is apparent that the file record may have various kinds of information defined by standards and recorded thereon. In this description, the file name record number will be the same as the series identification numbers used in FIG. 9A for the purposes of explanation.

Particularly, the file record type sorts files into four kinds. A "File Record Type=1" is an original directory, "File Record Type=2" is an original file, "File Record Type=3" is back-up directory, and "File Record Type=4" is a back-up file. In relation to this, "File Record Type=0" is a file record not used presently, i.e., a reserved area in the file table.

Accordingly, by reading the File Record Type information, an optical recording and reproducing apparatus may identify kinds of files.

The attribute information Attribute is information on various attributes of the file. For example, a "Hidden" attribute for performing a hiding function of the file, and a "Read inhibit" attribute for performing a read inhibit function of the file may be defined. Each attribute is indicated with 1 bit flag. If the file has the attribute, the flag is indicated as "1b", and if the file does not have the attribute, the flag is indicated as "0b".

For the purposes of explanation only, the method for recording a file record will be described for the example of recording the directories "7", "9", and file "18" in FIG. 9A. In the case of the directory "7", as the parent directory or file is the BDMV directory 2, the Parent Link is "Parent Link=2". The File Record Type for directory "7" is an original directory, so the File Record Type is "File Record Type=1". The attribute information Attribute, setting of which may vary with design, may be set to "Hidden=0b", which typically means a directory without the hiding function.

In the case of the directory "9", as the parent directory is the BDMV directory 2, the Parent Link is "Parent Link=2". The File Record Type is a back-up directory, so the File Record Type is "File Record Type=3". The attribute information Attribute, setting of which may also vary with design, may be set "Hidden=1b", which typically means a directory with the hiding function.

In the case of the file "18", as the parent directory is the "PLAYLIST_BUP" directory 8, the Parent Link is "Parent Link=8". The File Record Type is a back-up file, so the File Record Type is "File Record Type=4". The attribute information Attribute, setting of which may also vary with design, may be set "Hidden=1b", which typically means a file with the hiding function.

By forming the file table as described above, an entire file structure in which the back-up file exists can be shown clearly; identification of a file as the original file or the back-up file is made possible by the file record type File Record Type information; and problems, such as user's access to, and erasure of the back-up file in a particular case, can be prevented by preventing the user from detecting the existence of the file by using the hiding function in the attribute Attribute.

FIG. 10 illustrates an optical recording and reproducing apparatus of according to an embodiment of the present invention. As shown, the apparatus includes a pickup portion 11 for reading data and file information from an optical disc; a servo 14 for controlling operation of the pickup portion 11; a signal processing portion 13 for restoring a reproduced signal received from the pickup portion 11 to a desired signal value, or modulating a signal to be recorded into a signal recordable on the optical disc and transferring the modulated signal to the pickup portion 11; a memory 15 for temporarily storing the file information read from the optical disc; and a microcomputer 16 for controlling the above operations. The above described elements may collectively be called a recording and reproducing portion 20.

The microcomputer 16 reads file information, and sorts original management files and back-up files. If there is a defect on a particular file, the microcomputer 16 reads a back-up file of the defective file in view of a file structure, and uses the back-up file in managing reproduction of the disc.

The apparatus of FIG. 10 further includes an AV decoder 17 decoding output data from the signal processing portion 13 and providing the decoded data to the user under the control of a controlling portion 12. An AV encoder 18 converts an input signal into a signal of a particular format, for example, the MPEG2 transport stream, and provides the signal to the signal processing portion 13, under the control of the controlling portion 12, for recording of the signal on the optical disc.

The controlling portion 12, an element for controlling operation of entire optical recording and reproducing apparatus, serves to control the optical recording and reproducing apparatus in accordance with input received from a user through an interface with the user. The controlling portion 12, for example, transfers the user's order to the microcomputer 16 in the recording and reproducing portion 20. Particularly, in a case the attribute Attribute of a back-up file is "Hidden=1b" on the BD-ROM, the controlling portion 12 controls such that the user can not access the back-up file, and in a case the attribute Attribute of a back-up file is "Hidden=1b" on the BD-RE/BD-WO, the controlling portion 12 controls such that the user can not access to the back-up file. When a user intends to erase a particular original file, a corresponding back-up file is also erased, to prevent a reproduction error that can take place when only the back-up file remains. The controlling portion 12 may also control the apparatus to record the file structure of the present invention on the disc.

The provision of a back-up file of a management file, that manages reproduction of a disc, enhances security of the management file, thereby permitting effective reproduction of a high density recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

We claim:

1. A non-transitory recording medium storing a data structure for managing reproduction of data recorded thereon by a reproducing apparatus, the recording medium comprising:

original management data managing reproduction of stream data, the original management data including at least one stream information file, at least one playlist file, and at least one general management file, the at least one stream information file managing at least one stream file including the stream data, the at least one playlist file managing the at least one stream information file and the at least one stream file, the at least one general management file being associated with reproduction of the physical recording medium; and back-up management data in a back-up directory duplicating the original management data, the back-up directory not comprising duplicate stream files of the at least one stream file, wherein if a data in the original management data is erased, a corresponding back-up data in the back-up management data is erased for consistency between the original management data and the back-up management data, wherein the at least one playlist file includes at least one playitem and at least one sub-playitem, the playitem indicating an in-point and an out-point of the at least one stream file for reproducing the stream data in the at least one stream file, the sub-playitem indicating an in-point and an out-point of the at least one stream file for reproducing the stream data in the at least one stream file, wherein each of the at least one general management file and the back-up file thereof has a same file name and a same file extension, each of the playlist files and the back-up file thereof has a same file name and a same file extension, and each of the at least one stream information file and the back-up file thereof has a same file name and a same file extension, the playitem including a stream information indicator identifying a file name of a stream information file using the playitem, each stream file corresponding with one of the stream information files, a stream file and a corresponding stream information file having a same file name.

2. The non-transitory recording medium of claim 1, wherein the physical recording medium includes an index file and a movie object file as the general management files.

3. The non-transitory recording medium of claim 1, wherein the physical recording medium includes an info.bdav file, a menu.tidx file, and a mark.tidx file as the general management files.

4. The non-transitory recording medium of claim 1, wherein the original management data and the backup management data are not recorded in the same ECC block.

5. The non-transitory recording medium of claim 1, wherein the stream data includes at least video data.

6. The non-transitory recording medium of claim 1, wherein the original management data and the back-up management data is formed in a same directory, and
a file structure of the back-up management data is the same as a file structure of the original management data.

7. A method of reproducing data recorded on a recording medium, comprising:
reading at least one management data of original management data and back-up management data in a back-up directory, which is duplicate data of the original management data, the original management data manages reproduction of stream data and includes at least one stream information file, at least one playlist file, and at least one general management file, the at least one stream information file managing at least one stream file including the stream data, the at least one playlist file managing the at least one stream information file and the at least one stream file, the at least one general management file being associated with reproduction of the recording medium; and
reproducing the stream data in the at least one stream file based on the at least one management data,
wherein if a data in the original management data is erased, a corresponding back-up data in the back-up management data is erased for consistency between the original management data and the back-up management data,
wherein the back-up directory does not comprise duplicate stream files of the at least one stream file,
wherein the at least one playlist file includes at least one playitem and at least one sub-playitem, the playitem indicating an in-point and an out-point of the at least one stream file for reproducing the stream data in the at least one stream file, the sub-playitem indicating an in-point and an out-point of the at least one stream file for reproducing the stream data in the at least one stream file,
wherein each of the at least one general management file and the back-up file thereof has a same file name and a same file extension, each of the playlist files and the back-up file thereof has a same file name and a same file extension, and each of the at least one stream information file and the back-up file thereof has a same file name and a same file extension,
the playitem including a stream information indicator identifying a file name of a stream information file using the playitem,
each stream file corresponding with one of the stream information files, a stream file and a corresponding stream information file having a same file name.

8. The method of claim 7, wherein the back-up management data is to be read if a defect exists in the original management data.

9. The method of claim 7, wherein the original management data and the backup management data does not exist in the same ECC block.

10. The non-transitory recording medium of claim 7, wherein the original management data and the back-up management data is formed in a same directory, and
a file structure of the back-up management data is the same as a file structure of the original management data.

11. An apparatus for reproducing data recorded on a recording medium, comprising:
a controller configured to read at least one management data of original management data and back-up management data in a back-up directory, which is duplicate data of the original management data, the original management data manages reproduction of stream data and includes at least one stream information file, at least one playlist file and at least one general management file, the at least one stream information file managing at least one stream file including the stream data, the at least one playlist file managing the at least one stream information file and the at least one stream file, the at least one general management file being associated with reproduction of the recording medium, and configured to control the stream data in the at least one stream file to be reproduced based on the at least one management data,
wherein if a data in the original management data is erased, a corresponding back-up data in the back-up management data is erased for consistency between the original management data and the back-up management data,
wherein the back-up directory does not comprise duplicate stream files of the at least one stream file,
wherein the at least one playlist file includes at least one playitem and at least one sub-playitem, the playitem indicating an in-point and an out-point of the at least one stream file for reproducing the stream data in the at least one stream file, the sub-playitem indicating an in-point and an out-point of the at least one stream file for reproducing the stream data in the at least one stream file,
wherein each of the at least one general management file and the back-up file thereof has a same file name and a same file extension, each of the playlist files and the back-up file thereof has a same file name and a same file extension, and each of the at least one stream information file and the back-up file thereof has a same file name and a same file extension,
the playitem including a stream information indicator identifying a file name of a stream information file using the playitem,
each stream file corresponding with one of the stream information files, a stream file and a corresponding stream information file having a same file name.

12. The apparatus of claim 11, wherein the controller is configured to read the back-up management data if a defect exists in the original management data.

13. The apparatus of claim 11, wherein the original management data and the backup management data does not exist in the same ECC block.

14. The apparatus of claim 11, further comprising:
a reading unit configured to read out data from the recording medium, wherein the controller is configured to control the reading unit to read out the original management data or back-up management data.

15. The non-transitory recording medium of claim 11, wherein the original management data and the back-up management data is formed in a same directory, and
a file structure of the back-up management data is the same as a file structure of the original management data.

16. A method of recording a data structure for managing reproduction of data on a recording medium, comprising:
recording original management data managing reproduction of stream data, the original management data includes at least one stream information file, at least one playlist file, and at least one general management file, the at least one stream information file managing at least one stream file including the stream data, the at least one playlist file managing the at least one stream information file and the at least one stream file, the at least one general management file being associated with reproduction of the recording medium; and
recording back-up management data in a back-up directory duplicating the original management data, the back-up directory, not comprising duplicate stream files of the at least one stream file, wherein if a data in the original management data is erased, a corresponding back-up data in the back-up management data is erased for a consistency between the original management data and the back-up management data, wherein the at least one playlist file includes at least one playitem and at least one sub-playitem, the playitem indicating an in-point and an out-point of the at least one stream file for reproducing the stream data in the at least one stream file, the sub-playitem indicating an in-point and an out-point of the at least one stream file for reproducing the stream data in the at least one stream file, wherein each of the at least one general management file and the back-up file thereof has a same file name and a asame file extension, each of the playlist files and the back-up files thereof has a same file name and a same file extension, and each of the at least one stream information file and the back-up file thereof has a same file name and a same file extension, the playitem including a stream information indicator identifying a file name of a stream information file using the playitem, each stream file corresponding with one of the stream information files, a stream file and a corresponding stream information file having a same file name.

17. The method of claim 16, wherein the original management data and the backup management data are not recorded in the same ECC block.

18. The non-transitory recording medium of claim 16, wherein the original management data and the back-up management data is formed in a same directory, and
a file structure of the back-up management data is the same as a file structure of the original management data.

19. An apparatus for recording a data structure for managing reproduction of data on a recording medium, comprising:
a controller configured to control original management data managing reproduction of stream data, the original management data includes at least one stream information file, at least one playlist file, and at least one general management file, the at least one stream information file managing at least one stream file including the stream data, the at least one playlist file managing the at least one stream information file and the at least one stream file, the at least one general management file being associated with reproduction of the recording medium, and configured to control back-up management data in a back-up directory duplicating the original management data, the back-up directory not comprising duplicate stream files of the at least one stream file, wherein if a data in the original management data is erased, a corresponding back-up data in the back-up management data is erased for a consistency between original management data and the back-up management data, wherein the at least one playlist file includes at least one playitem and at least one sub-playitem, the playitem indicating an in-point and an out-point of the at least one stream file for reproducing the stream data in the at least one stream file, the sub-playitem indicating an in-point and an out-point of the at least one stream file for reproducing the stream data in the at least one stream file, wherein each of the at least one general management file and the back-up file thereof has a same file name and a same file extension, each of the playlist files and the back-up file thereof has a same file name and a same file extension, and each of the at least one stream information file and the back-up file thereof has a same file name and a same file extension, the playitem including a stream information indicator identifying a file name of a stream information file using the playitem, each stream file corresponding with one of the stream information files, a stream file and a corresponding stream information file having a same file name.

20. The apparatus of claim 19, wherein the controller is configured to control the original management data and the backup management data not to be recorded in a same ECC block.

21. The apparatus of claim 19, further comprising:
a recording unit configured to record data on the recording medium, wherein the controller is configured to control the recording unit to record the back-up management data at an outer radius portion of the recording medium.

22. The non-transitory recording medium of claim 19, wherein the original management data and the back-up management data is formed in a same directory, and
a file structure of the back-up management data is the same as a file structure of the original management data.

* * * * *